United States Patent [19]

Tighe et al.

[11] 4,433,111

[45] Feb. 21, 1984

[54] FLUORINE-CONTAINING HYDROGEL-FORMING POLYMERIC MATERIALS

[75] Inventors: Brian J. Tighe, Birmingham; Howard J. Gee, Derbyshire, both of England

[73] Assignee: Kelvin Lenses Limited, Manchester, England

[21] Appl. No.: 309,581

[22] Filed: Oct. 8, 1981

[30] Foreign Application Priority Data

Oct. 14, 1980 [GB] United Kingdom ............... 8033137
Oct. 14, 1980 [GB] United Kingdom ............... 8033061

[51] Int. Cl.³ .................... C08F 214/18; G02C 7/04
[52] U.S. Cl. ................. 525/326.2; 351/160 R; 351/160 H; 523/106; 523/107; 523/108; 525/117; 525/118; 525/119; 525/121; 525/293; 525/301; 525/302; 526/245; 526/264
[58] Field of Search ............... 526/245, 264; 523/106, 523/107, 108; 351/160 R, 160 H; 525/117, 118, 119, 121, 293, 301, 302, 326.2, 326.9

[56] References Cited

U.S. PATENT DOCUMENTS 3,658,857 4/1972 Kleiner et al. .................... 526/245

FOREIGN PATENT DOCUMENTS 17512 10/1980 European Pat. Off. .
2091417 1/1972 France .
1566249 4/1980 United Kingdom .

*Primary Examiner*—Harry Wong, Jr.
*Attorney, Agent, or Firm*—Stevens, Davis, Miller & Mosher

[57] ABSTRACT

Polymeric materials suitable for biomedical applications, particularly in making contact lenses, are formed by copolymerization and crosslinking of: (1) an amide of an unsaturated carboxylic acid such as acrylamide or methacrylamide; (2) an N-vinyl lactam such as N-vinyl pyrrolidone; (3) an ester of an unsaturated carboxylic acid such as a hydroxy-substituted ester of acrylic or methacrylic acid; (4) an unsaturated carboxylic acid such as acrylic or methacrylic acid; and (5) a hydrophobic monomer component comprising: (a) a fluorine-containing polymerizable monomer having a fluoroaliphatic side chain, such as fluoroalkyl acrylate or methacrylate, and (b) a non-fluorine-containing polymerizable hydrophobic vinyl monomer such as styrene; crosslinking with a crosslinking agent either being carried out during copolymerization or subsequently. The resulting polymeric materials may be machined to produce a contact lens form and then hydrated to form a hydrogel which is suitable for use as an extended wear contact lens.

15 Claims, No Drawings

FLUORINE-CONTAINING HYDROGEL-FORMING POLYMERIC MATERIALS

DESCRIPTION

This invention relates to polymeric materials suitable for use in bio-medical applications, in particular in manufacturing extended wear contact lenses, the materials having enhanced surface properties which improve their protein repellency.

The requirements for polymeric materials for use in bio-medical applications are both precise and severe. The material needs to be fabricable without degradation, inert in a biological environment, and toxicologically inactive. In addition, the material needs to have the required chemical, physical and mechanical properties for the particular application and to be sterilisable without adversely affecting these properties. These problems are particularly acute when the material is used in the manufacture of contact lenses.

Extended wear contact lenses formed from such materials need to be optically transparent, permeable to gases such as oxygen and carbon dioxide, easily elastically deformable with rapid recovery and hydrophilic at the surface so that the lachrymal fluid may wet the lens sufficiently to maintain a continuous tear film on the lens. In addition, such lenses should have sufficient physical durability to minimise scratching, tearing and splitting in normal, and preferably also abnormal useage.

One class of polymeric materials which can form extended wear contact lenses are those that form hydrogels when hydrated. Such materials are hard and brittle generally when dry but when swollen with water they have a soft jelly-like elastic consistency. If the hydrogel is to have the required oxygen permeability to make it suitable as a contact lens material, it must have a relatively high equilibrium water content when hydrated, since the "dissolved" oxygen permeability of hydrogels has been found to increase exponentially with increasing water content.

In our European Patent Application No. 80301136.0 we describe and claim vinyl polymeric materials which are suitable for biomedical applications, particularly as contact lens materials, are hydratable to form a hydrogel having an equilibrium water content of at least 65% by weight and have a desirably high tear strength. Thus they overcome disadvantages found with prior art materials that raising the equilibrium water content tends to result in an undesirable weakening of the material.

Known hydrogel-forming polymeric materials having a high equilibrium water content, in addition to being weak, tend to have a very hydrophilic surface and this is believed to lead to a build-up of matter on the surface of contact lenses formed from these materials which necessitates frequent removal of the lenses for cleaning and sterilisation. Such matter may for example be mucus debris or bacteria, particular problems being caused by the deposition of protein at the surface of the lens.

By including a hydrophobic monomer, exemplified as styrene and alkyl acrylates and methacrylates, in the polymeric materials of European Patent Application No. 80301136.0, the extent to which foreign matter is attracted to the lens is reduced but we have now found in accordance with the present invention, that by incorporating a controlled amount of fluoroaliphatic side chains into the materials, protein deposition can be further reduced while still maintaining a sufficiently high equilibrium water content to ensure adequate oxygen permeability and a sufficient hydrophilicity for a tear film to be maintained on the lens.

The present invention accordingly provides a polymeric material comprising units derived from:
(1) 20 to 40 mole % of a polymerisable amide which is an unsubstituted or substituted amide of a carboxylic acid containing olefinic unsaturation,
(2) 25 to 55 mole % of an N-vinyl lactam,
(3) 5 to 20 mole % of a polymerisable ester which is an ester of a carboxylic acid containing olefinic unsaturation,
(4) 1 to 10 mole % of a polymerisable carboxylic acid containing olefinic unsaturation, and
(5) 3 to 10 mole % of a hydrophobic monomer component comprising:
 (a) a fluorine-containing polymerisable monomer having a fluoroaliphatic side chain or a polymerisable monomer having an esterifiable group which is subsequently esterified with a fluorine-containing aliphatic acid or derivative thereof, and
 (b) a non-fluorine-containing polymerisable hydrophobic vinyl monomer;
the amounts of the monomers (1) to (5) totalling 100 mole % and the copolymer being cross-linked with a cross-linking agent.

The introduction of the monomer (5a) into the polymeric materials may be achieved by polymerising such a monomer having a fluoroaliphatic side chain with the other identified types of monomer. Alternatively, the polymerisation may be carried out with a monomer comprising esterifiable groups such as hydroxyl groups, and these groups in the polymer can subsequently be esterified with a fluorinated aliphatic acid or derivative thereof to provide the necessary fluoroaliphatic side chains attached to the backbone of the polymer.

The fluoroaliphatic side chain preferably comprises a fluoroalkyl group, preferably one containing up to about twelve carbon atoms, for example a fluorinated methyl, ethyl, propyl, or butyl group. Highly fluoro-substituted side chains are preferred for the purposes of the present invention, particularly those having a terminal trifluoromethyl group. The most preferred side chains are fluoro-substituted aliphatic ester groups, of the general formula

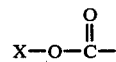

where X represents a fluoro-substituted alkyl group containing up to six carbon atoms, for example trifluoroethyl, 1,1,7-trihydroperfluoroheptyl, 1,1,5-trihydroperfluoropentyl, 1,1-dihydroheptafluorobutyl, 1,1,3-trihydroperfluoropropyl or, especially, hexafluoroisopropyl.

Specific examples of fluorine-containing monomers, which may according to one embodiment of the invention be reacted to form the polymeric materials, include fluorine-containing olefins and fluorine-containing unsaturated alcohols, carboxylic acids and esters. Particularly preferred are the fluoroalkyl esters of unsaturated carboxylic acids, for example esters of acrylic and methacrylic acids. Examples of suitable esters include trifluoroethyl acrylate and methacrylate, hexafluoroisopropyl acrylate and particularly its methacrylate, 1,1,3-trihydroperfluoropropyl methacrylate, perfluoroalkyl alkyl methacrylates of the formula

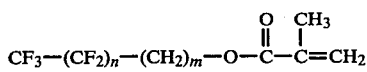

$$CF_3-(CF_2)_n-(CH_2)_m-O-\underset{\underset{O}{\|}}{C}-\underset{\underset{CH_3}{|}}{C}=CH_2$$

and fluoro-alcohol methacrylates of the formula

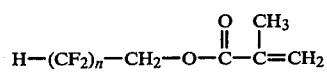

$$H-(CF_2)_n-CH_2-O-\underset{\underset{O}{\|}}{C}-\underset{\underset{CH_3}{|}}{C}=CH_2$$

where m and n are integers such that the perfluoroalkyl alkyl or fluoro-alcohol group contains up to twelve carbon atoms.

The degree of substitution of fluorine in the fluoroaliphatic side chains and the content of these fluorine containing groups in the polymer has a marked effect upon the physical properties of the polymeric materials and can suitably be varied to give the appropriate balance of properties required. The ability of the fluoroaliphatic side chains to affect the surface energy and hence to increase the protein repellency of the polymeric material has been demonstrated in tests on contact lenses in the presence of artificial tear fluid, as is illustrated below in the specific Examples. Moreover, the materials still have sufficient hydrophilicity to be suitable for use as contact lens materials and the equilibrium water content will generally be in excess of 63% by weight at 20° C. which enables the materials to have a sufficiently high oxygen permeability at 34° C. for use as contact lens materials.

Preferably the polymeric materials of the present invention are derived from 1 to 9 mole %, particularly 1 to 5 mole % of the fluorine-containing monomer (or precursor thereof) of component (5), based on the total monomer components, with the proportion of the non-fluorine-containing hydrophobic monomer being such that the total mole % of these hydrophobic monomers is 3 to 10 mole %, preferably 5 to 10 mole % e.g. 7 to 10 mole %.

The remaining monomers which react to form the polymeric materials of the invention are suitably as follows:

The olefinically unsaturated carboxylic acid or derivative thereof used in components (1), (3) and (4) is advantageously one containing a vinyl group of structure $CH_2=C<$ and is preferably acrylic or methacrylic acid.

Component (1) may be an amide of acrylic or methacrylic acid, for example acrylamide, methacrylamide or diacetone acrylamide. This component is present in the copolymer to provide strength and hydrophilicity. It is particularly preferred to use acrylamide alone or together with a mixture of methacrylamide and/or diacetone acrylamide. The latter combination confers a better hydrolytic stability on the material but with a reduced water content compared to acrylamide alone.

The N-vinyl lactam, component (2), is a weakly basic hydrophilic component. The compound may, for example, be N-vinyl pyrrolid-2-one or an alkyl substituted derivative thereof, for example, N-vinyl-5-methylpyrrolid-2-one, N-vinyl-5-ethylpyrrolid-2-one, N-vinyl-5,5-dimethylpyrrolid-2-one, N-vinyl-5,5-diethylpyrrolid-2-one or N-vinyl-5-methyl-5-ethylpyrrolid-2-one. Excellent results have been obtained with N-vinylpyrrolid-2-one.

Component (3) may be a hydroxy substituted ester of acrylic or methacrylic acid and is preferably a hydroxy propyl or hydroxy ethyl ester in particular, hydroxy propyl acrylate or hydroxy ethyl methacrylate, the 2-isomers being the more generally used isomers. This component is less hydrophilic than the lactam component; its incorporation reduces the tendency of blocks of the same monomer to form in the copolymer and hence facilitates the even distribution of water in the hydrated copolymer matrix.

The unsaturated aliphatic carboxylic acid (4) is present as a hydrophilic component and is capable of hydrogen bonding with the donor groups in the other monomers, thereby adding strength to the material. Thus, in order to achieve an appropriate balance of high water content and high strength, the quantities of the acid incorporated in the copolymer matrix and the N-vinyl lactam not incorporated in the copolymer matrix must be carefully controlled. The amount of component (4) reacted is preferably 1 to 3 mole %.

It is, however, unnecessary for the acid component (4) to be introduced specifically into the mixture of monomers since it may already be present in sufficiently high proportion as an impurity in the hydroxy-substituted ester component (3). An alternative way in which it can be introduced is by conversion of $CONH_2$ groups of the amide component (1) to COOH groups during autoclaving of the materials. These alternatives are intended to be comprehended within the scope of the invention.

A preferred example of the non-fluorine-containing vinyl monomer of component (5) is styrene. However, other hydrophobic monomers may be used, such as the monoesters of unsaturated aliphatic carboxylic acids, preferably esters of acrylic or methacrylic acid, for example, methyl methacrylate. Preferably styrene alone is used or a part of the styrene is replaced by the latter ester. By adjusting the total amount of the hydrophobic monomers of component (5) incorporated, the water content of the polymeric material may be adjusted.

The desired small amount of cross-linking can be introduced into the copolymer matrix either during copolymerisation or after the main copolymerisation to form a linear chain has been completed. The cross-linking agent is preferably added in an amount of up to 5, preferably up to 1, weight % based on the total weight of the monomers. When the cross-linking is introduced after the main copolymerisation it can be introduced in a final compression or injection moulding process in which the final optical form of the lens is produced. Such a method and suitable cross-linking agents are described in U.K. Patent Specification No. 1436705. In this case, it is desirable that the copolymer should be substantially linear at least prior to moulding so that it can undergo viscous flow under the reaction of heat and pressure above its glass transition temperature and permit the use of compression or injection moulding techniques. The proportion of cross-links introduced into the final copolymer will usually be quite small, preferably 1 to every 10 to 200 repeating polymer units on average and most preferably 1 to every 60 to 100 polymer units.

Examples of suitable cross-linking agents which can be used during the main copolymerisation are the diesters of unsaturated aliphatic carboxylic acids, such as ethylene glycol dimethacrylate and polyethylene oxide (for example of molecular weight 400) dimethacrylate or divinyl benzene. When the cross-linking agent is to be added immediately prior to moulding, it may be a diamide of an unsaturated aliphatic carboxylic acid, an anhydride of an aliphatic or aromatic carboxylic acid, a diepoxide or dicumyl peroxide. In the case of such cross-linking agents as ethylene glycol dimethacrylate there may be no necessity to add these specifically since, if hydroxyethyl methacrylate is used as component (3) this may contain sufficient of the diester as impurity to cross-link the material effectively.

According to a still further preferred embodiment of the present invention, the fluorine-containing polymer materials of this invention can be modified to increase their anti-bacterial properites by incorporating an ethylenically unsaturated monomer having a substituent possessing anti-bacterial activity, this monomer being incorporated either in addition to monomers (1), (2), (3), (4), (5a) and (5b) or in place of part of one or more of these. Modification of polymers by such monomers is described in British patent application No. 8033061.

Usually only a small quantity of the monomer having a substituent possessing anti-bacterial activity need be included in the polymer, for example up to 15% by weight, based on the total weight of the monomers, and preferably from 1 to 3% by weight.

The substituent possessing anti-bacterial activity may be derived, for example, from a compound having anti-bacterial properties, for example a phenol, such as an alkyl or aralkyl substituted phenol, a halogenated phenol, a halogenated alkyl or aryl substituted phenol, an amino substituted phenol, an amino substituted halogenated phenol, a polyhydric phenol, a halogenated polyhydric phenol, an acridine or an amino substituted acridine, an aryl or aralkyl alcohol, a halogenated alkyl or aryl alcohol, or an organic salt or other derivative of an organic or inorganic acid or amine. Suitable compounds having anti-bacterial properties may include, for example, polyhydric phenols and substituted polyhydric phenols such as 2,6-dibromo-3-hydroxyphenol, 3-hydroxy-4-n-pentylphenol, 3-hydroxy-4-n-octylphenol, 4-chloro-2, 4-dihydroxy-diphenyl-methane, aminophenols and substituted aminophenols such as 2,6-dibromo-4-aminophenol, 2,4,6-triaminophenol, 2,6-diamino-4-n-pentylphenol, 2,6-dinitro-4-aminophenol, cresols such as o-chlorocresol, alcohols and substituted alcohols such as benzyl alcohol, phenyl ethyl alcohol and chlorbutanol, acid and amino derivatives such as chlorhexidine diacetate, methyl, ethyl, and propyl hydroxybenzoate, phenylmercuric acetate, benzalkonium chloride ethylenediamino-tetraacetic acid, and thiomersal and centrimide.

An ethylenically unsaturated group may be introduced into compounds having anti-bacterial properties by reaction with an appropriate unsaturated compound, which may, for example in the case of a phenolic compound be an allyl halide, an allyl acid chloride or an allyl amide. Preferably, however, the monomer having a substituent possessing anti-bacterial activity comprises an acrylate or methacrylate group, and these may be introduced by reacting a compound having anti-bacterial properties, with for example acryloyl chloride or methacryloyl chloride.

Examples of particularly preferred ethylenically unsaturated compounds having a substituent possessing anti-bacterial activity include for example acryloyl and methacryloyl esters of the above mentioned polyhydric phenols and also acryloyl and methacryloyl amides of the above mentioned aminophenols and substituted aminophenols.

The polymerisation of the materials of the invention is suitably carried out in a bulk polymerisation system and initiated by radical initiators or catalysts, or by other radical-generating techniques such as photo initiation for example using u.v. rays.

The polymerisation may be carried out in bulk by mixing the monomer composition with a suitable catalyst in a sealed polyethylene tube to produce rods from which lenses may be lathe cut. Suitable initiators are t-butyl peroctoate, methyl ethyl ketone peroxide and azobisisobutyronitrile.

In bulk polymerisation, a problem may arise from the fact that polymerisation of acrylamide-containing compositions is known to be violent unless mild conditions of polymerisation are used. If however, the polymerisation is slow, this tends to result in rods of uneven composition with distorted (pyramid-like) shape because of side reactions. It has been found that the use of the initiator methylethylketone peroxide can help to product good quality rods via rapid, yet nonviolent, polymerisation of acrylamide-containing compositions at low temperatures.

A further problem is caused by the fact that the monomers used in preparing the material have different reactivity ratios which also vary with the polymerisation conditions, and hence the resulting rods tend to contain residual monomer which gives rise to tackiness and softening of the rod in some cases. Whilst post-cure and heat treatment in a vacuum removes the tackiness, it also inherently causes discolouration of the rods. Immersion and washing of the rods in suitable solvents, e.g. acetone, for 2 hours followed by washing with methanol can overcome the problem of tackiness as an alternative to prolonged post-cure.

The polymerisation takes place in two distinct stages, firstly gellation which is suitably carried out at a temperature of 40° C. to 70° C., but is generally in the range of 60° C. to 70° C. The gellation is normally complete within 1 to 4 days e.g. within 48 hours depending upon the temperature used, the nature and amount of the catalyst, the relative proportion of the monomers and the nature of any solvent present. This is then followed by a post-cure which is performed at a higher temperature e.g. 70° C. to 100° C., to complete the polymerisation and harden the rod. This latter stage is normally complete in several hours, e.g. up to 10 hours.

After polymerisation the copolymer may, if necessary, be treated to remove the residual monomer, solvent or initiators, washed and dried under vacuum.

In an alternative method of preparation as previously indicated, a hydrogel-forming polymer may first be prepared containing precursor groups which are then converted by reaction to the desired fluoroaliphatic side chains either before or after shaping or other manner of production of the finished article. For example, a hydrogel-forming polymer may be prepared containing hydroxyl groups or other esterifiable groups and these precursor groups may be esterified using a fluorine-containing aliphatic acid or a derivative thereof. The esterification may be carried out by swelling the polymer in an anhydrous aprotic solvent containing the fluorine-containing aliphatic acid or derivative thereof. For example a copolymer derived from a hydroxy alkyl acrylate or methacrylate may be reacted in tetrahydrofuran or a similar solvent with trifluoroacetic acid or more preferably the derived trifluoroacetylchloride or trifluoroacetylbromide. This technique has the advantage that the surface of the polymer may be preferentially treated after shaping into the finished article.

Where it is desired also to introduce groups having anti-bacterial properties, this is usually achieved by including a monomer possessing the groups in the copolymerisation. Another, though less preferred method is to graft an appropriate substituent group having anti-bacterial properties on to reactive sites on the polymer backbone. The grafting reaction may be carried out by reacting a compound having anti-bacterial properties with a suitably reactive polymer in order to graft a residue of the anti-bacterial compound, retaining the anti-bacterial properties, on to the polymer backbone. This procedure has the advantage that all the anti-bacterial substituents are introduced on to the surface of the polymer, but the reaction is found in practice to be less controllable than the polymerisation reactions previously described.

Finally the shaped article is immersed in water or an aqueous medium until equilibrium is reached. The equilibrium water content of the copolymer depends on the nature of the copolymer and its structure and according to this invention will, as indicated previously, generally be in excess of 63% by weight, for example 73% by weight at 20° C. (Water content is measured as weight of water based on weight of hydrogel (i.e. copolymer when swollen with the water)). High oxygen permeabilities can thus be achieved, for example, of the order of 400–800 e.g. $700 \times 10^{-10}$ at 34° C., the units being $cm^3$ (STP) mm $cm^{-2} sec^{-1} cm^{-1}$ Hg. This level of transmission compares with the theoretical requirement for extended wear of around $300 \times 10^{-10}$ at 34° C. and is over 4 times higher than the corresponding value for hydrated polyhydroxyethylmethacrylate.

When swollen in water, the polymeric materials are in the form of hydrogels which are particularly suitable for use in making extended wear contact lenses having improved surface properties. The polymeric materials of the invention may also be used in other instances where they are required to come into contact with living tissue. Examples of such applications are surgical implants and prosthetic devices for example blood vessels, artificial urethers, heart valves and artificial breast tissue. The polymeric material is also useful for contact with body fluids outside the body, for example, in manufacturing membranes for kidney dialysis and heart-/lung machines, swabs, nappy liners, would dressings and similar applications. The high strength of the polymeric materials when hydrated, together with their ability to be hydrated to such a great extent and to resist undesirable deposition of matter make them particularly valuable in these applications.

The invention will now be illustrated by reference to the following Examples.

EXAMPLES

COMPARATIVE EXAMPLE 1

(a) A masterbatch consisting of the following purified monomers was prepared:
Acrylamide: 33 mole %
Vinyl pyrrolidone: 47 mole %
Hydroxypropyl acrylate: 10 mole %
Styrene: 10 mole %

This mixture is stable and may be stored for several weeks at 0° C.

(b) To 100 grams of this masterbatch was added:
Methacrylic acid: 1 g
Ethylene glycol dimethacrylate: 1 g
Tertiarybutyl peroctoate: 0.13 g The mixture was poured into lengths of polyethylene tubing sealed at one end. The system was then purged with nitrogen and sealed. The polymerisation of the rods of material prepared in this way was effected by heating in a water bath at 50°–60° C. for 72 hours and then postcured for 2 hours at 90° C. in a vacuum oven.

The polymer prepared in this way was used to cut contact lenses which on hydration produced a lens having a water content at 20° C. of 73±1% by weight.

EXAMPLE 1

A masterbatch consisting of the following purified monomers was prepared:
Acrylamide: 33 mole %
Vinyl pyrrolidone: 47 mole %
Hydroxypropyl acrylate: 10 mole %
Styrene: 9 mole %
1,1,3-trihydroperfluoropropyl methacrylate: 1 mole %

The procedure described under Comparative Example (1b) was followed and a lens having the same (73±1% by weight) water content at 20° C. was produced.

EXAMPLE 2

A masterbatch consisting of the following purified monomers was prepared:
Acrylamide: 33 mole %
Vinyl pyrrolidone: 47 mole %
Hydroxypropyl acrylate: 10 mole %
Styrene: 8 mole %
1,1,3-trihydroperfluoropropyl methacrylate: 2 mole %

The procedure described in Comparative Example (1b) was followed and a lens having a water content at 20° C. of 72±1% by weight was produced.

EXAMPLE 3

Example 1 was repeated but the fluorine-containing component 1,1,3-trihydroperfluoropropyl methacrylate was replaced by 1 mole % of hexafluoroisopropyl methacrylate. A lens having a water content at 20° C. of 73±1% by weight was produced.

EXAMPLE 4

Example 2 was repeated but the fluorine-containing component 1,1,3-trihydroperfluoropropyl methacrylate was replaced by 2 mole % of hexafluoroisopropyl methacrylate. A lens having a water content at 20° C. of 72±1% by weight was produced.

COMPARATIVE EXAMPLE 2

(a) A masterbatch consisting of the following purified monomers was prepared:
Acrylamide: 20 mole %
Methacrylamide: 10 mole %
Diacetone-acrylamide: 10 mole %
Vinyl pyrrolidone: 40 mole %
Hydroxypropyl acrylate: 10 mole %
Styrene: 10 mole %

This mixture is stable and may be stored for several weeks at 0° C.

(b) To 100 grams of this masterbatch was added:
Methacrylic acid: 1 g
Ethylene glycol dimethacrylate: 1 g Tertiary butyl peroctoate: 0.13 g The mixture was poured into lengths of polyethylene tubing sealed at one end. The system was then purged with nitrogen and sealed. The polymerisation of the rods of material prepared in this way was effected by heating in a water bath at 50°-60° C. for 72 hours and then postcured for 2 hours at 90° C. in a vacuum oven.

The polymer prepared in this way was used to cut contact lenses which on hydration produced a lens having a water content at 20° C. of 72±1% by weight.

EXAMPLE 5

A masterbatch consisting of the following purified monomers was prepared:
Acrylamide: 20 mole %
Methacrylamide: 10 mole %
Diacetone acrylamide: 10 mole %
Vinyl pyrrolidone: 40 mole %
Hydroxypropyl acrylate: 10 mole %
Styrene: 9 mole %
1,1,3-trihydroperfluoropropyl methacrylate: 1 mole %

The procedure described under Comparative Example (2b) was followed and a lens having the same (72±1% by weight) water content at 20° C. was produced.

EXAMPLE 6

A masterbatch consisting of the following purified monomers was prepared:
Acrylamide: 20 mole %
Methacrylamide: 10 mole %
Diacetone acrylamide: 10 mole %
Vinyl pyrrolidone: 40 mole %
Hydroxypropylacrylate: 10 mole %
Styrene: 8 mole %
1,1,3-trihydroperfluoropropyl methacrylate: 2 mole %

The procedure described under Comparative Example (2b) was followed and a lens having a water content at 20° C. of 71±1% by weight was produced.

EXAMPLE 7

Example 5 was repeated but the fluorine-containing component 1,1,3-trihydroperfluoropropyl methacrylate was replaced by 1 mole % of hexafluoroisopropyl methacrylate. A lens having a water content at 20° C. of 72±1% by weight was produced.

EXAMPLE 8

Example 6 was repeated but the fluorine-containing component 1,1,3-trihydroperfluoropropyl methacrylate was replaced by 2 mole % of hexafluoroisopropyl methacrylate. A lens having a water content at 20° C. of 71±1% by weight was produced.

All the above Examples and Comparative Examples produced lenses of adequate strength and oxygen permeability to enable them to be used as both daily and extended wear lenses.

Protein Deposition Test

Lenses produced by the Examples and Comparative Examples and also prior art lenses were exposed to artificial tear fluid solution for one week, removed and placed in buffered saline. The deposits were assessed visually and by interference microscopy. In all cases, the fluorine-modified lenses of the invention showed relatively light deposit formation, whilst those of the unmodified materials and of the prior art materials showed heavy surface deposits.

Radio-iodine labelled fibrinogen was used to measure the susceptibility of the lenses to deposit formation. The deposits were measured by gamma counting and are expressed below in grams of deposit per lens.

| Example No. | g. of deposit per lens |
| --- | --- |
| Comparative Example 1 | $1800 \times 10^{-8}$ |
| Example 3 | $600 \times 10^{-8}$ |
| Comparative Example 2 | $900 \times 10^{-8}$ |
| Example 7 | $300 \times 10^{-8}$ |
| Poly HEMA* (Eurolens) | $1400 \times 10^{-8}$ |
| Sauflon 70** | $6000 \times 10^{-8}$ |
| Permalens+ | $1700 \times 10^{-8}$ |
| Duragel | $8000 \times 10^{-8}$ |

**Copolymer of vinyl pyrrolidone and methyl methacrylate
+Copolymer of vinyl pyrrolidone, methyl methacrylate and HEMA.
*HEMA = hydroxyethylmethacrylate.

The lenses produced according to Example 7 and comparative Example 2 were tested in 3 human patients each of whom wore the lens of Example 7 in one eye and the lens of Comparative Example 2 in the other eye continuously for several weeks. In each case, both lenses showed lipid/protein/mucopolysaccharide deposits but there was visually less deposit on the lens of Example 7 than that of Comparative Example 2 and the lens of Example 7 could be cleaned more effectively with commercially-available cleaners e.g. Barnes Hind cleaner no. 4 (buffered isotonic saline with added surfactants and preservatives).

We claim:
1. A crosslinked, fluorine-containing polymeric material suitable for use in biomedical applications, containing units derived either by simultaneous copolymerisation and crosslinking or by copolymerisation and subsequent cross-linking of the following monomers:
   (1) 20 to 40 mole % of an amide of acrylic or methacrylic acid;
   (2) 25 to 55 mole % of an N-vinyl lactam of the N-vinyl pyrrolidone type;
   (3) 5 to 20 mole % of a hydroxyalkyl ester of acrylic or methacrylic acid;
   (4) 1 to 10 mole % of acrylic or methacrylic acid; and
   (5) at least about 5 up to about 10 mole % of a hydrophobic monomer component comprising two monomer types (a) and (b) as follows:
      (a) a fluorine-containing olefine, or fluorine-containing unsaturated alcohol, unsaturated carboxylic acid or ester or a non-fluorine-containing unsaturated alcohol which, after copolymerisation of monomers (1) to (5), is esterified using a fluorine-containing aliphatic carboxylic acid or derivative thereof, and
      (b) a non-fluorine-containing polymerisable hydrophobic vinyl monomer which is at least one monomer selected from the group consisting of vinyl aromatic hydrocarbons of the styrene type and hydrophobic esters of acrylic or methacrylic acid;
   the monomers (1) to (5) totalling 100 mole %, the crosslinking having been effected with crosslinking amounts of a crosslinking agent, which, in the case of simultaneous copolymerisation and crosslinking, is an ester of a diol and acrylic or methacrylic acid or is divinylbenzene, or, in the case of crosslinking subsequent to copolymerisation, is a latent crosslinking agent which is a diamide of an unsaturated aliphatic carboxylic acid, an anhydride of an aliphatic or aromatic carboxylic acid, a diepoxide or dicumyl peroxide, the crosslinking agent having been used in an amount of up to 5 weight % based on the total weight of monomers (1) to (5).

2. A polymeric material according to claim 1 wherein component (5a) contains a fluoroalkyl group.

3. A polymeric material according to claim 2 wherein the fluoroalkyl group contains 1 to 12 carbon atoms.

4. A polymeric material according to claim 1 wherein component 5a contains a terminal trifluoromethyl group.

5. A polymeric material according to claim 1 wherein component (5a) contains a fluoro-substituted aliphatic ester group of the general formula

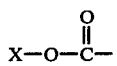

where X represents a fluoro-substituted alkyl group containing up to 6 carbon atoms.

6. A polymeric material according to claim 1 wherein component (5a) is a fluorine-containing unsaturated ester selected from the group consisting of trifluoroethyl acrylate, trifluoroethyl methacrylate, hexafluoroisopropyl acrylate, hexafluoroisopropyl methacrylate, 1,1,3-trihydroperfluoropropyl methacrylate, a perfluoroalkyl alkyl methacrylate of the formula

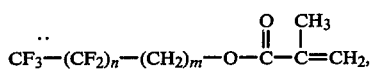

and a fluoro-alcohol methacrylate of the formula

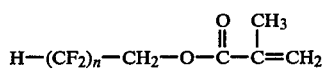

wherein m and n are integers such that the compounds contain up to 12 carbon atoms.

7. A polymeric material according to claim 1 containing units derived from 1 to 9 mole % of component (5a).

8. A polymeric material according to claim 1 wherein component (1) is acrylamide, methacrylamide or diacetone acrylamide or a mixture of two or all of these.

9. A polymeric material according to claim 1 wherein component (2) is N-vinylpyrrolid-2-one.

10. A polymeric material according to claim 1 wherein component (3) is hydroxy-propyl acrylate or hydroxy-ethyl methacrylate.

11. A polymeric material according to claim 1 wherein component (5b) is styrene, an ester of acrylic or methacrylic acid or a mixture thereof.

12. A polymeric material according to claim 1 wherein the crosslinking agent in the case of simultaneous copolymerisation and crosslinking is ethylene glycol dimethacrylate, a polyethylene oxide dimethacrylate or divinyl benzene.

13. A shaped article, suitable for producing a contact lens comprising a polymeric material as claimed in claim 1.

14. A process for preparing a crosslinked fluorine-containing polymeric material suitable for use in biomedical applications which comprises:
(a) simultaneous copolymerisation and crosslinking in a mould of a monomer mixture comprising:

(1) 20 to 40 mole % of an amide of acrylic or methacrylic acid;
(2) 25 to 55 mole % of an N-vinyl lactam of the N-vinyl pyrrolidone type;
(3) 5 to 20 mole % of a hydroxyalkyl ester of acrylic or methacrylic acid;
(4) 1 to 10 mole % of acrylic or methacrylic acid; and (5) at least about 5 up to about 10 mole % of a hydrophobic monomer component comprising two monomer types (a) and (b) as follows:
 (a) a fluorine-containing olefine, or fluorine-containing unsaturated alcohol, unsaturated carboxylic acid or ester or a non-fluorine containing unsaturated alcohol which, after copolymerisation of monomers (1) to (5), is esterified using a fluorine-containing aliphatic carboxylic acid or derivative thereof and
 (b) a non-fluorine-containing polymerisable hydrophobic vinyl monomer which is at least one monomer selected from the group consisting of vinyl aromatic hydrocarbons of the styrene type and hydrophobic esters of acrylic or methacrylic acid;

the monomers (1) to (5) totalling 100 mole %, the crosslinking having been effected with a crosslinking amount of a cross-linking agent which is an ester of a diol and acrylic or methacrylic acid or is divinylbenzene, the crosslinking agent being used in an amount of up to 5 weight % based on the total weight of monomers (1) to (5).

15. A process for preparing a crosslinked, flourine-containing polymeric material suitable for use in biomedical applications, which comprises:
(i) copolymerising a monomer mixture comprising:
(1) 20 to 40 mole % of an amide of acrylic or methacrylic acid;
(2) 25 to 55 mole % of an N-vinyl lactam of the N-vinyl pyrrolidone type;
(3) 5 to 20 mole % of a hydroxyalkyl ester of acrylic or methacrylic acid;
(4) 1 to 10 mole % of acrylic or methacrylic acid; and (5) at least about 5 up to about 10 mole % of a hydrophobic monomer component comprising two monomer types (a) and (b) as follows:
 (a) a fluorine-containing olefine, or fluorine-containing unsaturated alcohol, unsaturated carboxylic acid or ester or a non-fluorine-containing unsaturated alcohol which, after copolymerisation of monomers (1) to (5), is esterified using a fluorine-containing aliphatic carboxylic acid or derivative thereof, and
 (b) a non-fluorine-containing polymerisable hydrophobic vinyl monomer which is at least one monomer selected from the group consisting of vinyl aromatic hydrocarbons of the styrene type and hydrophobic esters of acrylic or methacrylic acid;

the monomers (1) to (5) totalling 100 mole %, and
(ii) compression or injection moulding the resulting copolymer in the presence of crosslinking amount of a latent crosslinking agent which is a diamide of an unsaturated aliphatic carboxylic acid, an anhydride of an aliphatic or aromatic carboxylic acid, a diepoxide or dicumyl peroxide, the crosslinking agent having been used in an amount up to 5 weight % based on the total weight of monomers (1) to (5).

* * * * *